Patented Mar. 13, 1934

1,950,879

UNITED STATES PATENT OFFICE 1,950,879

PREPARATION OF CALCIUM CYANIDE

Paul Johnson Carlisle and Charles Dangelmajer, Niagara Falls, N. Y., assignors, by mesne assignments, to E. I. du Pont de Nemours and Company, a corporation of Delaware No Drawing. Application October 15, 1928, Serial No. 312,735

5 Claims. (Cl. 23—79)

This invention relates to the preparation of a pulverulent calcium cyanide product by the action of hydrocyanic acid on lime suspended in a liquid medium.

Calcium hydroxide will react with an aqueous solution of hydrocyanic acid but it is practically impossible to prepare a solid cyanide product from the resulting solution. This difficulty is due to the fact that water hydrolyzes the calcium cyanide and much of the hydrocyanic acid resulting therefrom, is lost on concentrating the aqueous solution and, at the same time, the calcium hydroxide causes polymerization of further quantities of the hydrocyanic acid.

A liquid reaction medium has certain advantages, however, such as permitting adequate agitation of the reaction mixture and easy control of temperature. Therefore, it is the object of the present invention to provide a process for the preparation of a calcium cyanide product in a liquid medium in which the difficulties due to the hydrolytic action of water are avoided.

We have discovered that a pulverulent calcium cyanide product containing the equivalent of 40 to 48% by weight of $Ca(CN)_2$ can be readily prepared by suspending commercial burnt lime, containing approximately 90% by weight of active CaO, in a suitable non-aqueous liquid, such as ethyl ether, and adding thereto the necessary amount of hydrocyanic acid and an accelerating agent.

It is advisable to agitate the mixture, to maintain it at the boiling point of the liquid medium, and to reflux the vaporized liquid during the reaction period.

We have found it necessary to use accelerating agents for the reaction because otherwise the rate of reaction is unsatisfactory. As such an agent we prefer to use ammonia and water together. The reaction can be accelerated by water alone, but it is preferable to have ammonia present, because then the amount of water needed is smaller which is important because the water appears in the final product as calcium hydroxide and this reduces the possible percentage of cyanide. Anhydrous ammonia alone is not satisfactory. The proportion of water and ammonia can be varied considerably.

The amount of accelerator to be used will vary somewhat with the nature of the reaction medium, the nature of the lime and other factors. In general the water should amount to about 3% by weight or more referred to the anhydrous hydrocyanic acid. The ammonia may be added as such, or as an aqueous solution, or as ammonium cyanide, and should amount to about 1 to 3% by weight of the hydrocyanic acid. In general, however, we do not want to limit ourselves to any definite quantities or proportions of accelerators.

The lime serves two purposes in this process. In the first place, it acts as a base to unite with the hydrocyanic acid and, in the second place, it serves to hold in chemical combination the water produced by the reaction. This means that, in theory, one-half of the lime is available for cyanide formation and the other half for hydroxide formation. The product may be a mixture of calcium cyanide and calcium hydroxide, or a molecular compound of the two, or it may be a basic calcium cyanide corresponding to the formula $Ca(OH)CN$. The exact chemical composition of the product is not definitely known and we do not limit ourselves in this respect.

When the reaction between lime and hydrocyanic acid in a non-aqueous medium is substantially complete the water is sufficiently removed so as to present practically no difficulties in the recovery of the solid product. In other words, there is practically no hydrolysis and no polymerization of the product during the evaporation of the medium from the solid product under partial pressure.

The maximum theoretical cyanide content of the product is approximately 55.4% by weight calculated as $Ca(CN)_2$. In general, the purer the lime to start, the higher the cyanide content of the product. In working with lime prepared from marble and containing approximately 98% by weight of active calcium oxide we have obtained products containing cyanogen equivalent to 47.4% by weight of $Ca(CN)_2$. In other experiments we have made products containing cyanogen equivalent to more than 48% by weight of $Ca(CN)_2$. The average product, using commercial lime containing approximately 90% active CaO by weight, will contain cyanogen equivalent to about 45% by weight of $Ca(CN)_2$.

In addition to ethyl ether, we have used other reaction media with substantially the same result in regard to the cyanogen content of the solid product. For example, we have employed methylene chloride, ethylene dichloride, petroleum ether, and methanol. So far as the cyanogen content of the solid product is concerned, approximately the same results can be secured with the various media. However, each one presents certain advantages and disadvantages which should be recognized. Thus, methanol is a fairly good solvent for the solid product but, during the subsequent evaporation of the methanol and unreacted HCN under reduced pressure, the product does not dry readily with formation of a finely divided powder. Instead there is a tendency for the product to form into lumps of various sizes, from which it is difficult to expel the remainder of the liquid. Ethylene chloride has the disadvantage of a relatively high boiling point, 84° C., which, of course, adds appreciably to the difficulty of evaporating under reduced pressure to secure a dry product. It, also, has a relatively high specific gravity so that a comparatively large weight of it is required for a given volume.

We have found that a reaction medium such as methanol, in which the solid product is relatively soluble, imposes the disadvantage that the reaction must be much more carefully controlled to prevent polymerization and darkening of the product. This may be due to the fact that both the solid product and water are readily soluble in methanol and, consequently, there is greater opportunity for hydrolysis of the product and polymerization of the hydrocyanic acid.

We may summarize the desirable characteristics of a satisfactory reaction medium as follows:

(a) It should be chemically inert towards the reaction materials. That is, it should not react with HCN or with lime under the conditions of this process.

(b) It should be miscible with anhydrous HCN at least to the extent of 25% HCN by volume and should dissolve practically no calcium cyanide; that is, the solid product produced in this process.

(c) It should preferably boil somewhat above the boiling temperature of hydrocyanic acid (about 25° C.) in order to raise the refluxing temperature and speed up the reaction. But it should not boil at too high a temperature, because a fair degree of volatility is desirable in drying the product.

(d) It should not be too dense or viscous since it is desirable to decant as much free liquid as possible before evaporating the residue.

*Examples*

1. 600 ccs. of anhydrous ethyl ether, cooled to about 5° C., and 235 grams of lime containing about 90% active CaO, ground to pass a 200 mesh screen, were placed in a 2 liter balloon flask equipped with a mechanical agitator, a thermometer, and a vapor line carrying a reflux condenser cooled with brine. The agitator was started and to the suspension were added 3 ccs. of distilled water and 3.9 grams of solid ammonium cyanide. No cooling of the reaction mixture was employed other than that supplied by the surrounding air, the temperature of which was 22.5° C. Then 102 grams of anhydrous liquid HCN was added within a period of 5 minutes.

When all of the HCN had been added, the temperature of the reaction mixture was 31.6° C. For three hours the temperature varied from 29.0° to 32.7° C. At the end of 4 hours and 45 mins. the temperature had fallen to 26.2° C., which was about 3.7° C. higher than the room temperature. This drop in temperature indicated that the reaction was practically complete and the treatment was stopped.

The solid product was allowed to settle and the clear liquid was decanted. The residual sludge was evaporated under reduced pressure yielding as a product 329.4 grams of a very light tan-colored powder containing cyanogen corresponding to 86.6 grams of HCN, equivalent to 147.6 grams of $Ca(CN)_2$, which is equivalent to 44.8% by weight of $Ca(CN)_2$.

2. Into a round bottom flask equipped as described in Example No. 1 was charged 78.3 grams of U. S. P. lime, containing approximately 98% by weight of active CaO and ground to pass a 200 mesh screen, and 200 cc. of anhydrous ethyl ether, cooled to about 5° C. The agitator was started and to the suspension was added 1 cc. of distilled water and 1.3 grams of solid ammonium cyanide. To the mixture was now added 37.4 grams of liquid anhydrous HCN over a period of 3 minutes.

At this time the temperature had risen to 32.5° C. and, during the following two hours, the temperature varied from 28.9° C. to 32.8° C. At this time the temperature had begun to fall and the treatment was stopped.

The flask contained very little clear liquid, indicating that with high grade lime it is desirable to use a somewhat larger proportion of ether to lend the desired fluidity to the reaction mixture. Only 3 ccs. of clear liquid could be drained off. The residual sludge was evaporated under reduced pressure, yielding 111.4 grams of a very light tan-colored powder, containing cyanogen equivalent to 30.63 grams of HCN or 52.2 grams of $Ca(CN)_2$, equivalent to 47.4% by weight of $Ca(CN)_2$.

3. Into an apparatus similar to that described in the above examples we charged 78.3 grams of lime containing approximately 90% by weight of active CaO, ground to pass a 200 mesh screen, and 200 ccs. of anhydrous ethyl ether cooled to 5° C.; the agitator was started and to the mixture was added 1.5 ccs. of an aqueous solution of ammonia containing approximately 16% by weight of ammonia. To the mixture was then added 34 grams of liquid anhydrous HCN over a period of 4 minutes. At the end of this time the temperature had risen to 31.8° C. At the end of 30 minutes the temperature had fallen to 28.4° C. At this time 1 cc. of anhydrous ammonia was added to the mixture. The temperature rose to 29.1° C., but, about 30 minutes later, it had again fallen to around 26.1° C. At this time 1 cc. of anhydrous liquid ammonia was added to the mixture with a consequent rise in temperature. During the following hour the temperature rose steadily to 32.9° C. From this point it slowly declined and the treatment was finally stopped at the end of 3 hours and 30 minutes, when the temperature had fallen to 24.8° C. The room temperature throughout the experiment was approximately 21.1° C. The product was allowed to settle and 49 ccs. of clear liquid was decanted. The residual sludge was evaporated under reduced pressure, yielding 111.3 grams of a very light colored powder, containing cyanogen equivalent to 29.6 grams of HCN or 50.5 grams of $Ca(CN)_2$, equivalent to 45.4% by weight of $Ca(CN)_2$ in the solid product.

4. Into an apparatus as described above was charged 70.5 grams of commercial burnt lime containing about 90% by weight of active CaO and ground to pass a 200 mesh screen, and 200 ccs. of methylene chloride; the agitator was started and 1.5 cc. of an aqueous solution of ammonia containing about 16% by weight of ammonia was added. To this mixture was then added 37.4 grams of liquid anhydrous HCN over a period of about 15 minutes. The temperature rose from 24° C. to 37° C. The temperature quickly fell however, to 30° C. and 1 cc. of anhydrous ammonia was added to the reaction mixture. The result was a further increase in temperature to 33° C. The temperature stayed at around this point for approximately 2 hours after the HCN was all added.

The reaction was interrupted 2 hours and 30 minutes after all of the HCN had been added. The reaction mixture was evaporated under reduced pressure. A solid good looking product was obtained. It weighed 103 grams and contained cyanogen equivalent to 28.55% HCN, equivalent to 48.65% by weight $Ca(CN)_2$.

We claim:

1. Process for the manufacture of a pulverulent hydrated calcium cyanide product comprising suspending powdered unslaked lime in ethyl ether, adding liquid hydrocyanic acid to said suspension, effecting the reaction by means of water added in accelerating quantity and thereafter separating the pulverulent product from the liquid medium.

2. Process for the manufacture of a pulverulent hydrated calcium cyanide product comprising suspending powdered unslaked lime in ethyl ether, adding liquid hydrocyanic acid to said suspension, effecting the reaction by adding 1–3% by weight of water and thereafter separating the pulverulent product from the liquid medium.

3. Process for the manufacture of a pulverulent hydrated calcium cyanide product comprising suspending powdered unslaked lime in a non-aqueous liquid medium which is chemically inert to the reactants and to the product, has substantially no hydrolytic or solvent effect on the product and boils at a point between about 25° and 84° C., adding hydrocyanic acid to said suspension, effecting the reaction by adding 1–3% by weight of water and 0–3% by weight of ammonia and thereafter separating the pulverulent product from the liquid medium.

4. Process for the manufacture of a pulverulent hydrated product containing between 40 and 55% calcium cyanide comprising suspending powdered unslaked lime in ethyl ether, adding approximately chemically equivalent amounts of liquid hydrocyanic acid to said lime and accelerating the reaction by adding thereto water, in amounts between about 1 and about 3%, and ammonia in amounts from 0 to 3%, and thereafter separating the pulverulent product from the liquid medium.

5. Process for the manufacture of a pulverulent hydrated calcium cyanide product comprising suspending powdered unslaked lime in a non-aqueous liquid medium of the group consisting of ethylene chloride, methylene chloride and ethyl ether, adding hydrocyanic acid to said suspension, effecting the reaction by adding 1–3% by weight of water and 0–3% by weight of ammonia and thereafter separating the pulverulent product from the liquid medium.

PAUL JOHNSON CARLISLE.
CHARLES DANGELMAJER.